J. VAUDREUIL.
SPRAY.
APPLICATION FILED JUNE 7, 1919.
1,390,069.
Patented Sept. 6, 1921.
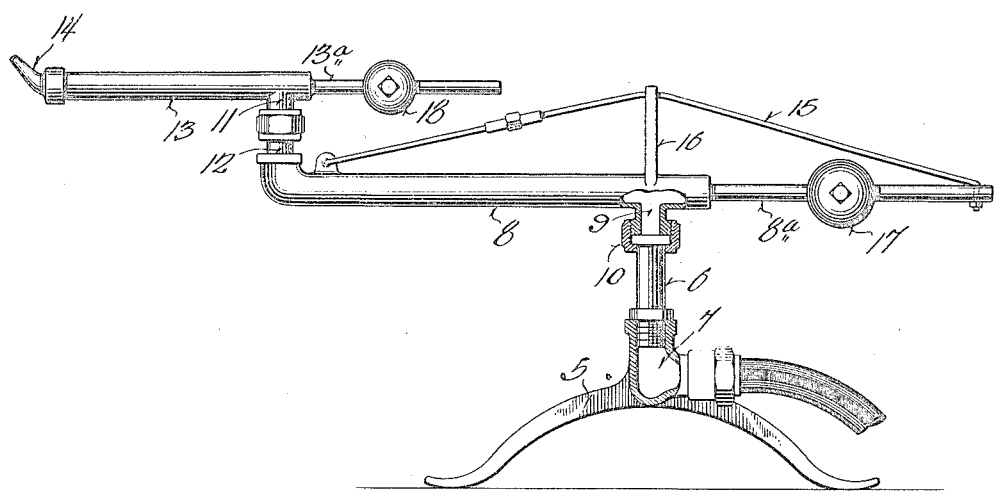
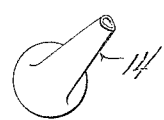
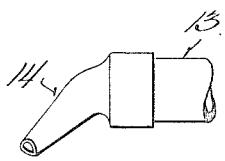
WITNESS:
INVENTOR.
John Vaudreuil
BY
ATTORNEY.

UNITED STATES PATENT OFFICE.

JOHN VAUDREUIL, OF MILWAUKEE, WISCONSIN.

SPRAY.

1,390,069.   Specification of Letters Patent.   Patented Sept. 6, 1921.

Application filed June 7, 1919. Serial No. 302,461.

*To all whom it may concern:*

Be it known that I, JOHN VAUDREUIL, a citizen of the United States, and resident of Milwaukee, in the county of Milwaukee and State of Wisconsin, have invented certain new and useful Improvements in Sprays; and I do hereby declare that the following is a full, clear, and exact description thereof.

My invention relates to new and useful improvements in fluid distributing devices of that type adapted to discharge jets of fluid in constantly varying directions and comprising a rotative member to which motion is imparted by the force of water in leaving the device, the invention being particularly applicable to lawn sprayers, dish washers or the like.

It is the object of my invention to increase the range and improve the uniformity of fluid distribution of devices of this character, and it is more particularly my object to provide an arrangement whereby the effective force of the water in leaving the device is rendered intermittently differential in nature so as to set up a jerky rotative action which, when the device is utilized as a lawn spray, for instance, will propel the water a maximum distance from the device.

It is further my object to embody the afore-recited features in a simple and strong device which will prove durable and reliable in operation under continued use.

It is still further my object to provide an arrangement for varying the rotative action of the distributing device whereby to afford a proper regulation of its operation in accordance with differing water pressures which would be encountered, and other operative conditions.

The present invention embodies certain features which are disclosed in my co-pending application which has matured into Patent No. 1,314,622, issued September 2, 1919.

With the above and other objects and advantages in view, which will be apparent as the description proceeds, my invention resides in the novel features of construction, combination and arrangement of the parts as hereinafter described and defined by the appended claims.

In the accompanying drawings:

Figure 1 is a side elevational view through a fluid distributing device constructed in accordance with my invention and adapted for use as a lawn spray.

Fig. 2 is a detail end view of the distributing nozzle of the device.

Fig. 3 is a plan view of the distributing nozzle.

Referring now more particularly to the lawn spray embodiment of my invention shown in the accompanying drawing, there is provided a base 5 from which extends a vertical pipe 6 communicating with an inlet nipple at its lower portion for connection with a hose or other source of water supply. A supply member is mounted for horizontal rotation on the pipe 6, said supply member comprising in the present instance a pipe section 8 and a rod section $8^a$ although if desired said member may be formed more simply of a single length pipe. A nipple 9 depends from the pipe adjacent the juncture of its sections, said nipple seating on the flanged upper end of the pipe 6 and being held in swivel connection therewith by a flanged sleeve 10 threaded on the nipple 9. A distributing member is mounted on the outer end of the pipe section 8, for horizontal rotation, by an intermediate depending nipple 11 swiveled on an upstanding nipple 12 carried by the pipe section, this distributing member comprising in the present instance a pipe section 13 and a rod section $13^a$. The outer end of the pipe section 13 carries a discharge nozzle 14 which is inclined upwardly and rearwardly from the pipe section with respect to its direction of rotation procured by water discharged from the nozzle. It is further noted that the cross sectional area of the discharge mouth of the nozzle 14 is taperingly decreased in width toward its inner side, as shown particularly in Fig. 3, whereby the greater volume of the water is discharged toward the outer side of the nozzle to procure an even distribution of water in accordance with the greater area of the outer zone of the surface supplied by the device. In some instances, the supply member may be of relatively great length to cover a large area in the operation of the device, and said member may be braced by guy rods 15 extending to the ends of the members from posts 16 upstanding on their central portions. A weight 17 is adjustably mounted on the rod section $8^a$ of the supply member and a similar weight 18 is adjustably mounted on the rod section $13^a$ of the distributing member. These weights procure an adjustable over-balanced condition of the rotating members with respect to their axes of rotation.

In the operation of my distributing device, it is noted that when the distributing member is in the position shown in the drawing, the water discharged from the nozzle 14 imparts a positive rotative impulse to the supply member as well as to the distributing member. As the distributing member swings to a right angle position, a retarding action is exerted on the rotation of the supply member, which, however, would be less than the rotative impulse procured in the outward position of the nozzle 14. Thus, in operation a jerky action of the supply member is set up which aids the natural pressure momentum of the water in flinging the water a maximum distance from the device.

It is further noted that by varying the overbalanced nature of the arms, the rotative speeds effected in the device may be readily varied.

While I have shown the supply tube 8 as not provided with a discharge nozzle at one end, such a nozzle may obviously be provided if desired and other nozzle relations or other changes and modifications of structure may be employed without departing in any manner from the spirit of my invention which consists in providing rotative impulses for the end of the distributing member whereby to exert a variable rotative action on the supply member.

What is claimed is:

1. A fluid distributing device including a vertical supply pipe, an imperforate supply tube mounted on the supply pipe for horizontal rotation and communicating with the supply pipe, a distributing tube swivelly mounted on the supply tube at a point remote from the axis of rotation of the supply tube and a discharge nozzle on the distributing tube directed laterally whereby to rotate the distributing tube and to impart differential rotation to the supply tube.

2. A fluid distributing device including a vertical supply pipe, a supply member intermediately swiveled on the supply pipe for horizontal rotation, a distributing member intermediately swiveled on one end portion of the supply member for horizontal rotation, an adjustable weight on the other end portion of the supply member, a laterally directed discharge nozzle on one end portion of the distributing member and an adjustable weight on the other end portion of the distributing member.

3. A fluid distributing device including a vertical supply pipe, a supply member swiveled on the supply pipe for horizontal rotation, a distributing member intermediately swiveled on the supply member at a point remote from the axis of rotation of the supply member, a laterally directed discharge nozzle on one end portion of the distributing member and an adjustable weight on the other end portion of the distributing member.

4. A fluid distributing device including a vertical supply pipe, a supply tube mounted on the supply pipe for horizontal rotation and communicating with the supply pipe, a distributing tube swivelly mounted on the supply tube at a point remote from the axis of rotation of the supply tube and a discharge nozzle on the distributing tube directed laterally whereby to rotate the respective tubes and to impart rotative impulses to the supply tube, the cross sectional area of the discharge mouth of said nozzle being taperingly decreased toward the axis of rotation of the distributing tube.

5. A fluid distributing device including a vertical supply pipe, a supply tube mounted on the supply pipe for horizontal rotation and communicating with the supply pipe, a distributing tube rotatably mounted on the supply tube at a point remote from the axis of rotation of the supply tube, and means for discharging fluid from the distributing tube to impart rotative momentum to the tube, the momentum effected by such discharge of fluid being unbalanced with respect to the axis of rotation of the discharge tube whereby to impart differential rotative impulses to the supply tube upon rotation of the distributing tube.

In testimony that I claim the foregoing I have hereunto set my hand at Milwaukee, in the county of Milwaukee and State of Wisconsin.

JOHN VAUDREUIL.